Sept. 11, 1945.　　　　E. WILDHABER　　　　2,384,584
FACE CLUTCH
Original Filed Dec. 21, 1942　　3 Sheets-Sheet 1

Inventor
ERNEST WILDHABER
By
Attorney

Sept. 11, 1945. E. WILDHABER 2,384,584
FACE CLUTCH
Original Filed Dec. 21, 1942 3 Sheets-Sheet 2

Inventor
ERNEST WILDHABER
By
Attorney

Sept. 11, 1945.  E. WILDHABER  2,384,584
FACE CLUTCH
Original Filed Dec. 21, 1942   3 Sheets-Sheet 3

Inventor
ERNEST WILDHABER
By
Attorney

Patented Sept. 11, 1945

2,384,584

UNITED STATES PATENT OFFICE 2,384,584

FACE CLUTCH

Ernest Wildhaber, Brighton, N. Y., assignor to Gleason Works, Rochester, N. Y., a corporation of New York Original application December 21, 1942, Serial No. 469,610. Divided and this application September 3, 1943, Serial No. 501,158

15 Claims. (Cl. 192—67)

The present invention relates to toothed face clutches and to methods and apparatus for producing such clutches. In a more particular aspect, the invention relates to the construction and production of clash-type toothed face clutches, that is, clutches whose members are adapted to be engaged while the driver, at least, is rotating. The present application is a division of my copending application Serial No. 469,-610, filed December 21, 1942, and deals specifically with my novel form of clutch.

Since the teeth and tooth spaces of the two engaging members of a clash-type clutch are not always in exact register when the clutch members are moved into engagement, their teeth are chamfered to facilitate engagement. The chamfered parts of the teeth of the clutch members have to carry the loads at the beginning of engagement of the clutch members, and since these loads are high, shock loads, it is important that the teeth of clash-type face clutches be so chamfered that the chamfered portions as well as the main portions of the teeth can stand and carry heavy loads.

A primary object of the present invention is to provide a toothed face clutch which will have correct tooth chamfer and be capable of carrying heavy loads even when only the chamfered portions of the teeth of the mating clutch members are in engagement. To this end, it is one aim of the invention to provide a toothed face clutch whose members have the chamfered portions of their teeth so shaped that they contact midway of the length of the chamfered portions and, if desired, along the whole length thereof in all positions of partial engagement of the clutch members as the clutch members move into full engagement.

A further object of the invention is to provide an improved type of chamfer surface for toothed face clutch members through which contact of the chamfer surfaces midway of the tooth length, or if desired, along the whole of the tooth length may be obtained exactly and without relying on approximate shapes.

Another object of the invention is to provide a clash-type face clutch in which the chamfered portions of teeth of the two members are conjugate to one another.

A further object of the invention is to provide mating clash-type face clutch members in which the chamfered portions of the teeth of one member are form-cut and the chamfered portions of the teeth of the other member are generated conjugate to the form-cut chamfered portions of the first member.

Other objects of the invention will be apparent hereinafter from the specification and from the recital of the appended claims.

Toothed face clutch members constructed according to the preferred embodiment of the present invention have longitudinally curved side tooth surfaces and longitudinally curved chamfered portions. The side tooth surfaces of both members are surfaces of revolution. The chamfered portions of the teeth of one member are surfaces of revolution coaxial with the side tooth surfaces of that member, while the chambered portions of the teeth of the other member are helicoidal surfaces conjugate to the chamfered portions of the teeth of its mate. The term "helicoidal surface" is used in this application in a broad sense to describe a surface enveloped by a surface of revolution which moves along and about an axis, usually with a varying ratio of angular to axial motion.

Preferably, opposite sides of spaced teeth of each member of the pair are cut and chamfered in a single operation. Opposite sides of spaced teeth of one member and the chamfered portions at the corresponding sides of said spaced teeth may be made parts of coaxial longitudinally concave surfaces of revolution, while opposite sides of spaced teeth of the other member may be made parts of a common longitudinally convex surface of revolution. The chamfered surfaces at the corresponding sides of the teeth of this latter member may be made parts of longitudinally convex helicoidal surfaces conjugate to the chamfered surfaces of the mating clutch member.

Several different embodiments of the invention are illustrated in the accompanying drawings in which.

Figure 1:
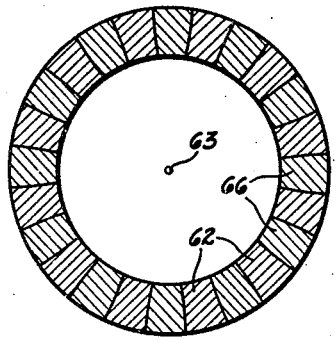
Fig. 1 is a sectional view showing a pair of toothed face clutch members made according to one embodiment of this invention in engagement, the section being taken in a mean plane, hereinafter referred to as the pitch plane, which is perpendicular to the clutch axis.
Figure 2:
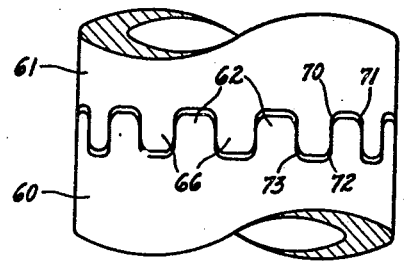
Fig. 2 is a fragmentary elevational view of the pair of engaging clutch members.
Figure 3:
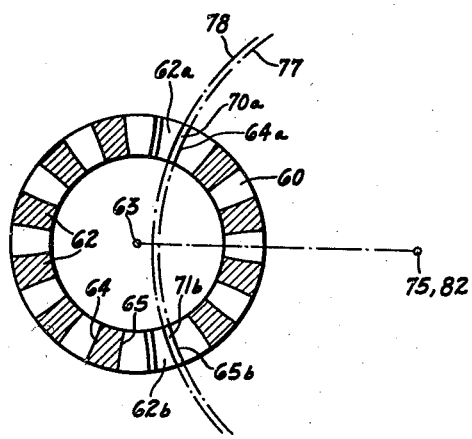
Fig. 3 is a diagrammatic view, showing one of the clutch members partly in section in the pitch plane and partly in plan, and illustrating the principles underlying the cutting and chamfering of the teeth of this member.
Figure 5:
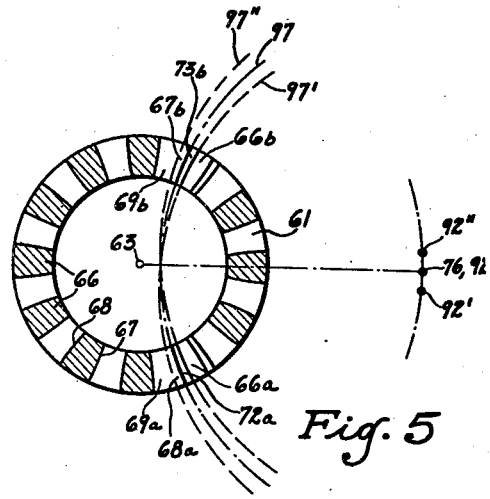
Figs. 5 and 6 are views similar to Figs. 3 and 4, respectively, showing the mating clutch member and illustrating one way of cutting and chamfering the teeth of this mating clutch member.
Figure 4:
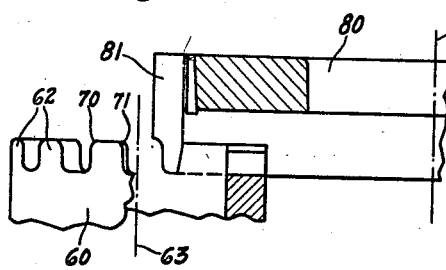
Fig. 4 is a part elevational, part sectional view, further illustrating one way in which the teeth of this clutch member may be simultaneously cut and chamfered.
Figure 6:
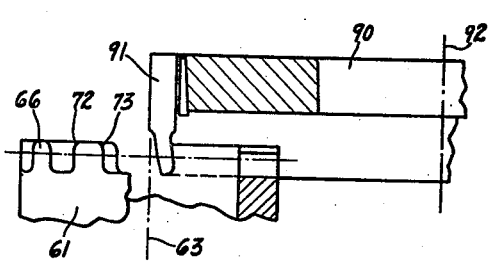
Figures 20, 21:
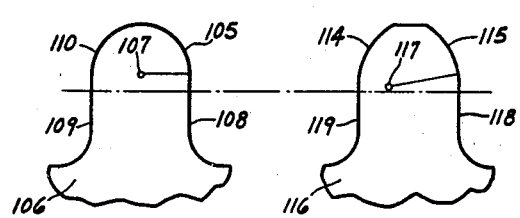
Figure 22:
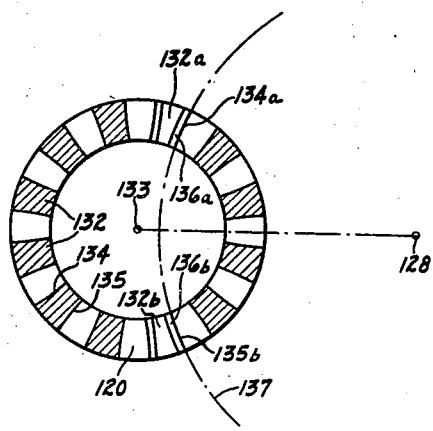
Figure 24:
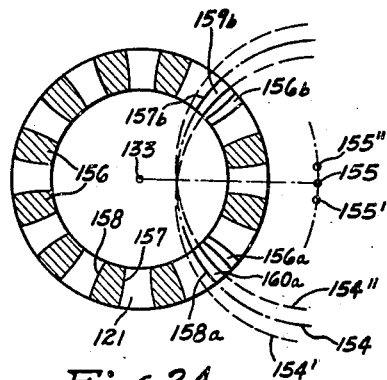
Figure 23:
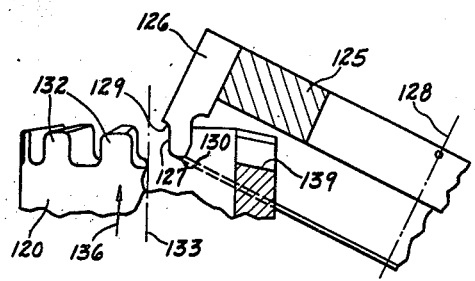
Figure 25:
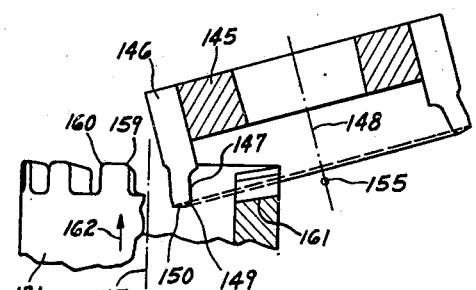
Figure 26:
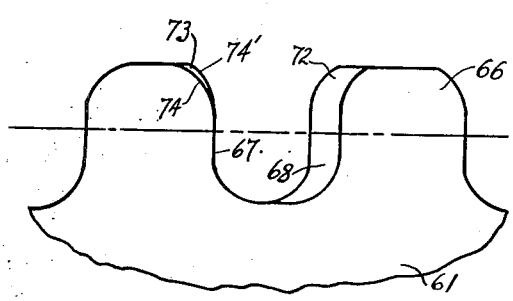

Figs. 10 to 19 inclusive are diagrammatic views illustrating successive steps in the chamfering and cutting of opposite sides of spaced teeth of a clutch member according to one embodiment of this invention, Figs. 10 to 14 inclusive being views of the cutting and chamfering of one side of a tooth of the clutch member, and Figs. 15 to 19 inclusive being views of the cutting and chamfering of the opposite side of a spaced tooth of the clutch member;

Fig. 20 is a normal sectional view on an enlarged scale of a tooth of a clutch member made according to a modification of this invention;

Fig. 21 is a similar view showing a tooth of a clutch member made according to a still further modification of the invention;

Figs. 22 and 23 are views similar to Figs. 3 and 4, respectively, showing a clutch member made according to a further modification of the invention and illustrating how a cutter having side-cutting edges of positive pressure angle may be employed for chamfering and cutting the teeth of this member;

Figs. 24 and 25 are views similar to Figs. 5 and 6, respectively, showing the mating clutch member and illustrating how a cutter having side-cutting edges of positive pressure angle may be employed in the chamfering and cutting of this clutch member; and Fig. 26 is a fragmentary elevational view of one member of a clutch pair made according to this invention, illustrating particularly the character of the chamfered portions of the tooth surfaces of this clutch member.

Reference will be had first to the embodiment of the invention illustrated in Figs. 1 to 19 inclusive. Here 60 and 61 denote, respectively, the two members of a clutch pair. The member 60 has teeth 62 which extend generally radially of the clutch axis 63 and whose opposite sides 64 and 65 are longitudinally concave. The mating clutch member 61 has teeth 66 which extend generally radially of the clutch axis 63 and whose opposite sides 67 and 68 are longitudinally convex.

The teeth 62 of member 60 are chamfered along their top edges on both sides as denoted at 70 and 71. The teeth 66 of member 61 are chamfered along their top edges on both sides as denoted at 72 and 73.

The sides of the teeth of both clutch members are of zero pressure angle in the instance shown, that is, the profiles of the sides 64 and 65 and 67 and 68 of the teeth of both members extend in the direction of the clutch axis 63. In the instance shown, the sides of the teeth of both clutch members are cylindrical surfaces parallel to clutch axis 63. Moreover, opposite sides of spaced teeth of each clutch member are portions of a common cylindrical surface. Thus, opposite sides 64a and 65b of the teeth 62a and 62b, respectively, of clutch member 60 are parts of a common cylindrical surface whose axis is at 75 and is parallel to the clutch axis 63. Likewise, opposite sides 68a and 67b of spaced teeth 66a and 66b, respectively, of clutch member 61 are portions of a common convex cylindrical surface whose axis is at 76 parallel to clutch axis 63.

The chamfered portions 70 and 71 of the teeth of the clutch member 60 are surfaces of revolution concentric with the corresponding sides of the teeth. Thus, the chamfered portions 70a and 71b at opposite sides of the teeth 62a and 62b, respectively, are longitudinally concave surfaces of revolution of convex profile shape whose common axis is at 75. The chamfered portions 72 and 73 of clutch member 61 are on the other hand helicoidal surfaces of varying lead conjugate to the chamfered portions of the teeth of the clutch member 60. They are of longitudinally convex shape and of convex profile shape. A portion of the clutch member 61 is shown on an enlarged scale in Fig. 26. It will be noted that the inclination to the clutch axis of the chamfered portions 72 and 73 of the teeth increases with increasing radial distance from the clutch axis. Thus the profile 74 at the outer end of the chamfered surface 73 has a greater inclination to the tooth side 67 than the profile 74' at the inner end of the chamfered surface.

For cutting and chamfering the teeth of clutch member 60, a face mill cutter 80 (Figs. 4, 8 and 9) may be used. The blades 81 of this cutter are arranged circularly about the axis 82 of the cutter and have cutting portions which project beyond one side face of the cutter in the general direction of the axis of the cutter. The blades 81 may be all outside cutting blades, and may have a straight side-cutting edge 83 of zero pressure angle, a concave chamfering edge 84, a tip cutting edge 85 and a round 86 which connects the side-cutting edge 83 with the tip-cutting edge 85. The concave chamfering edge lies below the side-cutting edge adjacent the shank or body portion of the blade. The front faces of the blades may be sharpened in usual manner with the side rake and the outside surfaces of the blades may be relieved with a combined radial and axial relief to provide keen outside cutting and keen chamfering edges. The clearance or non-cutting sides of the blades may be of any suitable shape.

The cutter 80 is preferably positioned to cut simultaneously in two spaced tooth zones of the work. The cutter is so positioned that its axis 82 is parallel to the axis 63 of the work and coincides with the axis 75 of the tooth surfaces to be cut on the work. Cutting is effected by rotating the cutter 80 on its axis 82 while holding the work 60 stationary on its axis 63 and while effecting a relative depthwise feed movement between the cutter and the work until full depth position is reached. The depthwise feed movement may be in the direction of the axis 63 of the work or it may be in a direction inclined to said axis. In full depth position, the straight side-cutting edges 83 (Fig. 9) of the cutter will sweep out and form opposite sides 64 and 65 on spaced teeth of the work which are coaxial and longitudinally concave cylindrical surfaces, while the concave chamfering edges 84 of the cutter will sweep out and form chamfer surfaces 70 and 71 of convex profile at these same sides of the spaced teeth of the work which are coaxial with one another and with said sides of the teeth as already described. 76 denotes the path of a point in the chamfering edge of the tool and 77 the path of a point in the side-cutting edge of the tool at full depth.

When a pair of tooth sides have been cut and chamfered, the cutter is withdrawn from engagement with the work and the work indexed. Then the cycle begins anew. Thus the tooth sides and chamfer surfaces of the clutch member 60 may be produced simultaneously in a forming operation and in a rapid and efficient process.

The form-cutting method used in cutting and chamfering the teeth of clutch member 60 cannot be applied to the cutting and chamfering of the teeth of the mating clutch member 61, for if the chamfer surfaces of both members were form-cut, the chamfered portions of mating teeth would contact only at the outer ends of the teeth as the clutch members were moved into engagement, and the chamfered portions accordingly could not carry heavy loads. The present invention provides, however, a way for chamfering the teeth of the clutch member 61 so that any desired amount of lengthwise contact can be obtained between the engaging clutch members as they move into engagement. This contact may extend along the whole length of the chamfered portions of the teeth if desired or along any portion of that length. This contact is obtained by generating the chamfered portions 72 and 73 of the teeth of the clutch member 61 so that they have profile shapes conjugate to the profile shapes of the chamfered portions 70 and 71 of the teeth of the clutch member 60 and so that their lengthwise shapes match to any desired extent the lengthwise shapes of the chamfered portions of clutch member 60.

For cutting and chamfering clutch member 61, a face mill cutter 90 (Figs. 6, 8 and 9) may be employed that has a plurality of inside cutting blades 91 which are arranged circularly about the axis 92 of the cutter and which have cutting portions projecting beyond one side face of the cutter in the general direction of the axis 92 of the cutter. The blades 91 have straight inside-cutting edges 93, chamfering edges 94, and tip-cutting edges 95. The side-cutting edges 93 may be of zero pressure angle or of slight negative pressure angle, that is, of slight negative inclination to cutter axis 92. The chamfering edges 94 are of convex profile shape, but unlike the chamfering edges 84 of cutter 80, the chamfering edges 94 of the cutter 90 are arranged adjacent the tips of these blades instead of adjacent the shank portions of the blades. In fact, the chamfering edges 94 of blades 91 connect the side-cutting edges 93 of the blades with the tip-cutting edges 95 thereof.

The convex chamfering edge 94 of a blade 91 has the same profile shape as the convex chamfer surface 70 or 71 of clutch member 60, that is, it is a circular arc of the same radius 96 as the concave chamfering edge 84 of a blade 81 of cutter 80. It will be seen, therefore, that when the cutter 90 is rotated on its axis 92, it embodies the chamfered portions of clutch member 60.

Figure 7:
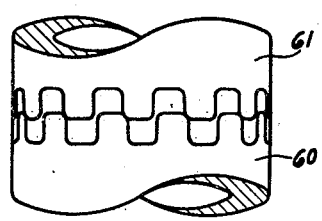
Fig. 7 is a fragmentary elevational view, showing the pair of mating clutch members being moved into engagement and illustrating the conjugacy of the chamfered portions of the teeth of the two clutch members.

To generate the required chamfer on the teeth of the clutch member 61, the cutter 90 is rotated on its axis in engagement with the work while a relative feed movement is effected between the cutter and the work about the clutch axis 63 and in the direction of said axis. The motion produced is as if the clutch member 60 were contacting at various points along the height of the chamfered surfaces of its teeth with the chamfered surfaces of the clutch member 61 as the two clutch members are moving into engagement. In other words, in cutting the chamfered portions of the teeth of clutch member 61, the cutter 90, which represents the chamfered portion of a tooth of the clutch member 60, assumes such positions relative to the work as are assumed by the chamfered portions of a tooth of the clutch member 60 as the chamfered portion of that tooth engages with and moves over the chamfered portion of a mating tooth of clutch member 61 during movement of the two clutch members into engagement. One of the positions of partial engagement of the two clutch members is shown in Fig. 7.

Figure 8:
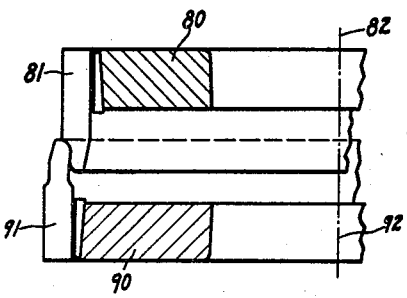
Fig. 8 is a fragmentary axial sectional view showing two face mill cutters such as may be employed for cutting the two members of the clutch pair, respectively, and showing the relationship which exists between these two cutters.
Figure 9:
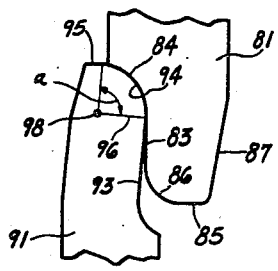
Fig. 9 is a view on an enlarged scale of matching blades of the two cutters, further illustrating the relationship in construction which exists between the cutters.

The relationship of the cutters 80 and 90 for cutting the two clutch members is clearly illustrated in Figs. 8 and 9. It is seen that the convex chamfering edge 94 of a blade 91 of cutter 90 matches the concave chamfering edge 84 of a blade 81 of cutter 80. Moreover, the convex chamfering profile 94 is an arc of the identical circle but preferably is made to extend slightly beyond the concave chamfering edge 84. The straight side-cutting edges 93 and 83 of the two blades need not match. In fact, the straight side-cutting edge 93 of blade 91 is slightly inclined to the straight side-cutting edge 83 of blade 81. Due to the depthwise feed, the sides as well as the chamfer surfaces of the teeth of clutch member 61 are formed by the convex cutting edges 94 herein referred to as chamfering edges.

The inside cutting diameter of cutter 90 will be the same as the outside cutting diameter of cutter 80 if the mating chamfer surfaces and mating side surfaces of the two clutch members are to have full length contact, but lengthwise mismatch of mating chamfer and mating side surfaces can be obtained by using a cutter of smaller inside diameter to cut clutch member 61 and skipping less teeth between the two tooth zones in which this cutter operates.

In cutting the chamfered portions of clutch member 61, the rotation about the clutch axis 63 is usually performed by the work and the feed movement in the direction of the clutch axis is also performed by the work. There is a definite coordination required between the rotation about the clutch axis and the feed lengthwise of this axis. The required coordination may be determined to correspond to assumed mean chamfer profiles, for instance, by layout. The chamfered surfaces 72 and 73 produced are helicoidal surfaces, usually helicoidal surfaces of varying lead. The rotary motion of the work need take place only while a chamfered surface is being cut. The sides 67 and 68 of the teeth may be cut with the work stationary by depthwise feed of the rotating cutter into the work.

In the preferred embodiment of the invention, a face mill cutter 90 is employed which is of sufficiently large diameter to operate in two spaced tooth zones of the work simultaneously. The chamfered part at one side of a tooth of the work is cut during in-feed while the blank is being rotated in time with the in-feed movement. Then the rotation of the blank is stopped but the in-feed is continued to cause the cutter to cut simultaneously the side of the tooth previously chamfered and the opposite side of a spaced tooth of the work as portions of a common surface of revolution. Then the cutter is withdrawn and when it has been partially withdrawn, the work rotation commences again so that during the last part of the withdrawal motion, the cutter will chamfer the last named tooth on the same side as has been cut.

Different relative angular positions of the cutter about the clutch axis during cutting and chamfering of opposite sides of spaced teeth of clutch member 61 are shown diagrammatically in Fig. 5. The chamfered portion 73b of tooth 66b of clutch member 61 is being produced when the axis of the cutter is at 92' and the cutter has been partially fed into depth. The path of a point in the cutting edge of the tool for this position is denoted at 97'. The side surface 67b of tooth 66b and the opposite side surface 68a of tooth 66a spaced from tooth 66b are formed when the cutter axis is in mean position 92, and the cutter is moving to full-depth position. The path of said point in the cutting edge of the tool for this position is denoted at 97. The chamfered surface 72a of tooth 66a is being produced when the cutter axis is at position 92'' and the cutter is being partially withdrawn. 97'' denotes the path of the same cutting point when the cutter is at this cutting position. In this way, the chamfered portion of one side of a tooth and subsequently the opposite sides of spaced teeth of clutch member 61 are cut during the in-feed, while the remaining chamfered portion is produced during the out-feed.

The cutting and chamfering cycle for clutch member 61 is further illustrated in Figs. 10 to 19 inclusive. Figs. 10 to 14 inclusive illustrate the cutting action which takes place in one zone of cutting engagement, namely, in the cutting and chamfering at one side of a tooth 66b, and these are figures looking from the inside of the clutch outwardly. Figs. 15 to 19 inclusive illustrate the cutting action which takes place in the other zone of cutting engagement, namely, in the cutting and chamfering at one side of tooth 66a, and these views are looking from the outside of the clutch inwardly. The rounded chamfering edges 94 of the cutting blades 91, therefore, are at the right in both instances.

Figures 10, 11, 12, 13, 14:
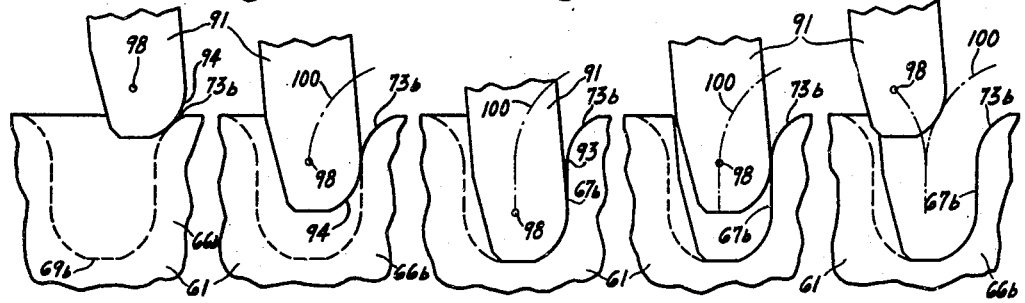
Figures 15, 16, 17, 18, 19:
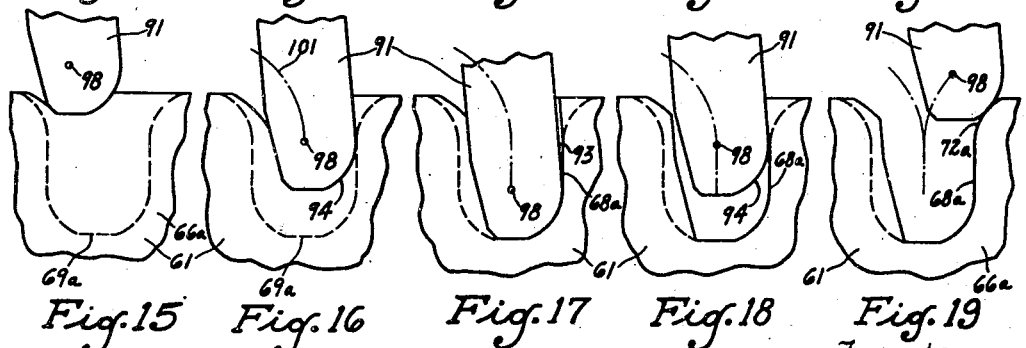

Fig. 10 shows the start of the cut on the rounded chamfer surface 73b of tooth 66b. The final shape of the tooth space 69b adjacent the tooth side 76b is shown in dotted lines. While the cutter is cutting in the tooth space 69b of the blank, it is also cutting in the tooth space 69a. The start of the cut in the latter tooth space is shown in Fig. 15. As the rotating cutter is fed relatively depthwise into the blank, the blank is rotated on its axis in time with the depthwise feed movement to generate the chamfer surface 73b. When the cutter reaches the position illustrated in Figs. 11 and 16, the chamfer surface 73b is completed. Then the turning motion about the clutch axis 63 ceases, but the depthwise feed in the direction of this axis continues. Figs. 12 and 17 show the position of the cutter at full depth. Here the side-cutting edges 93 will have cut the opposite sides 67b and 68a of the teeth 66b and 66a and the chamfering edges 94 of the cutter will sweep out and produce the rounded fillets which join these tooth sides with the bottoms of the tooth spaces 69b and 69a. Then the withdrawal motion starts. At the position indicated in Figs. 13 and 18, the cutter has been withdrawn far enough for the chamfering of the side 72a of tooth 66a to start.

Then the rotation about the work axis begins again, and as the cutter travels outwardly from the position of Figs. 13 and 18 to the position of Figs. 14 and 19, it produces the chamfered surface 72a of tooth 66a. As soon as the cutter has moved clear of the work, the blank is indexed. Then the cutter is fed back into engagement with the work and the cycle of chamfering and cutting opposite sides of spaced teeth of the work begins anew.

In Figs. 10 to 19 inclusive, dotted line 100 denotes the path of the centers 98 of chamfering edges 94 of cutter 90 at one tooth zone of the work, and dotted line 101 denotes the path of these same centers in the other tooth zone of the work during the cutting and chamfering cycle.

Various types of chamfer may be obtained with the method of the present invention. One form of chamfer surface that can be produced is illustrated in Figs. 1 to 19 inclusive. Other forms are shown in Figs. 20 and 21. In Fig. 20, 105 denotes the profile of the chamfered surface at one side of tooth 106. This profile is a circular arc whose center is at 107. Such a chamber surface joins the straight zero pressure angle tooth side 108 smoothly without angle. The center 107 may be midway between the sides 108 and 109 of the tooth 106 and the top of the tooth may be fully rounded, as shown. In Fig. 21, the chamfer surface 115 is again of circular arcuate profile shape, but its profile shape is of larger radius being centered at 117. The chamfer surfaces 115 and 114 at the sides of the tooth 116 may join the respective tooth sides 118 or 119 at slight angles. Of course, the chamfer surfaces need not be of circular arcuate profile shape but may be of any desired profile curvature.

The clutch members 60 and 61 of Figs. 1 to 6 inclusive have teeth of uniform height from end to end and the root lines of the teeth lie in a plane perpendicular to the clutch axis. A more preferable embodiment of the invention is illustrated in Figs. 22 to 25 inclusive where the clutch members have tooth spaces whose root surfaces are conical surfaces and are inclined to the clutch axis. The clutch members of Figs. 22 to 25 have the added advantage that they may be cut with cutters having side-cutting edges of positive pressure angle.

Cutters, like the cutters 80 and 90, which are used in cutting the clutch members 60 and 61, have side-cutting edges of zero or negative pressure angle. Hence, they must be relieved radially as well as axially in order to provide cutting clearance. After sharpening, moreover, the blades of such cutters must be readjusted radially individually in order to maintain the cutter diameter. Such an adjustment is objectionable and can be avoided by use of cutters having side-cutting edges of positive pressure angle, for blades having side surfaces of positive pressure angle can be axially relieved and axial adjustment of the cutter itself, after sharpening of the blades, will properly readjust all the blades of the cutter simultaneously.

In Figs. 22 to 25 inclusive, one member of a clutch pair is denoted at 120 and the mating member at 121. The clutch member 120 is cut with a face mill cutter 125 which has a plurality of circularly arranged cutting blades 126. Each blade has an outside cutting edge 127, a chamfering edge 129, and a tip-cutting edge 130. The outside cutting edge is of straight profile and positive pressure angle or inclination to the cutter axis 128. The chamfering edge 129 is of concave profile shape and lies adjacent to the shank of the blade. The tip-cutting edge 130 is preferably made perpendicular to the side-cutting edge 127 and is, therefore, inclined with reference to the cutter axis 128 at other than right angles. The highest part of the tip-cutting edge is at its outer end.

For cutting the toothed face clutch member 120 whose tooth sides 134 and 135 are of zero pressure angle, the cutter 125 is tilted inwardly with reference to the work. Opposite sides 134 and 135 of spaced teeth 132 of the clutch member 120 are chamfered and cut in a single cycle of operation by rotating the cutter 125 on its axis 128 while holding the work 120 stationary on its axis and effecting a relative depthwise feed movement between the cutter and the work preferably in a direction 136 (Fig. 23) slightly inclined to the direction of clutch axis 133.

The tooth sides and the chamfered surfaces produced on the clutch member are counterparts of the chamfering and cutting surfaces of the cutter 125. Both sides of the teeth of the clutch member are of longitudinally concave shape and the chamfered portions at opposite sides of the teeth are of longitudinally concave shape. The sides of the teeth are of straight profile and zero pressure angle, while the chamfered portions are of convex profile.

The dot-dash line 137 in Fig. 22 denotes the path of a point in the side-cutting edge of the tool at full depth position. Opposite sides of spaced teeth as, for instance, the sides 134a and 135b of the teeth 132a and 132b, are portions of a common conical surface whose axis coincides with the cutter axis 128 in full depth position of the cutter and intersects the clutch axis 133. The chamfered surfaces 136a and 136b at these same sides of these spaced teeth are also portions of surfaces of revolution coaxial with the conical sides of the teeth. The bottoms 139 of the tooth spaces of the clutch member are inclined to the clutch axis and are substantially conical surfaces coaxial with the clutch member.

The mating clutch member 121 may be cut with a face mill cutter 145 whose blades 146 are arranged circularly about its axis 148. These blades (Fig. 25) have inside cutting edges 147, chamfering edges 149, and tip-cutting edges 150. The inside cutting edges 147 are of positive pressure angle and inclined to the cutter axis 148. The tip-cutting edges 150 are perpendicular to the side-cutting edges 147 and therefore inclined at other than right angles to the axis 148 of the cutter. They are highest at their inner ends. The chamfering edges 149 are of convex profile shape and connect the side-cutting edges 147 with the tip-cutting edges 150 of the blades. The profile of the convex chamfering edge 149 of a blade 146 of cutter 145 matches the concave profile of a chamfering edge 129 of cutter 125 so that the convex chamfering portions of cutter 145 represent the chamfered top of a tooth of clutch member 120 as the cutter rotates on its axis.

The cutter 145 may be of the same inside diameter as the outside diameter of the cutter 125, but if it is desired to have lengthwise mismatch between the contacting surfaces of the two clutch members for localization of tooth bearing, then the inside diameter of cutter 145 is reduced as compared with the outside diameter of cutter 125. The purpose of this is to ease off the contact at the tooth ends. With the smaller diameter cutter 145, convex tooth sides 157 and 158 will be cut on teeth 156 of the clutch member 121 which are more curved lengthwise than the concave sides 134 and 135 of the mating clutch member 120. A smaller angle will be skipped between the two tooth zones operated upon by the cutter 145 than is skipped between the two tooth zones operated upon by the cutter 125.

For cutting the clutch member 121, the cutter 145 is tilted outwardly with reference to the clutch member 121 to cut side tooth surfaces of zero pressure angle on the clutch member.

The teeth of clutch member 121 are chamfered and have their sides cut in the same way as the teeth of the clutch member 61. The cutter 145 is rotated in engagement with the work and a relative feed motion is produced about and in the direction of the clutch axis 133 to generate the chamfered portions 159 and 160 of the teeth. The depthwise feed movement is in the direction of the arrow 162 if imparted to the work. When the chamfered portion at one side of a tooth has been completed, the rotational movement of the work is stopped, but the relative depthwise feed movement continues until full depth position is reached. During this depthwise feed movement, opposite sides of spaced teeth of the clutch member are cut as parts of a common convex cylindrical surface of revolution coaxial with the cutter axis 148. Then the cutter is withdrawn from engagement with the work. When the cutter has been withdrawn a sufficient distance from full-depth position, the work rotation is restarted and, during the further withdrawal motion, the chamfered portion 160 of a tooth is cut. When the cutter is clear of the work, the work is indexed.

The relative feed motion about the clutch axis is illustrated in Fig. 24 by the movement of a point in the cutter axis 148. When this point is at 155', the chamfered surface 159b of tooth 156b is being generated, and the path of a point in the cutting edge of the cutter is at 154'. When the said point in the cutter axis is at 155, the mean cutter path is at 154 and the sides 157b and 158a of spaced teeth 156b and 156a are formed. The chamfer 160a on tooth 156a is generated during the withdrawal movement of the cutter when the cutter is at partial depth engagement. When the said point in the cutter axis is at 155'' and the path of a point in the cutting surface is at 154'', the chamfered portion 160a of tooth 156a is being generated.

Preferably, the smaller diameter cutter 145 is designed so that its axis 148 may be inclined to the clutch axis 133 at a smaller angle than the angle of inclination of the cutter axis 128 to clutch axis 133 during production of the clutch member 120. Thus the root lines 161 of the tooth spaces cut in the clutch member 121 may be inclined to the clutch axis 133 at approximately the same angle as are the bottoms 139 of the tooth spaces of the clutch member 120.

The tops of the teeth of the two clutch members 120 and 121 may be plane surfaces perpendicular to the clutch axis 133, but preferably the tops of the teeth of clutch member 120 are shaped, as shown, to lie in an external conical surface coaxial with the clutch and the tops of the teeth of clutch member 121 are shaped, as shown, to lie in an internal conical surface coaxial with the clutch. By properly selecting the angles of these conical top surfaces, the teeth of both clutch members can be made of uniform height from end to end.

While the invention has been described in connection with clutch members having longitudinally curved teeth, it will be understood that in its broad aspects it is also applicable to clutches having longitudinally straight teeth. Further it will be understood that it is not limited in application to clutch members having side tooth surfaces of zero pressure angle but may be applied also to clutch members of positive pressure angle although ordinarily its use is confined to clutch members of low pressure angle. Still further it will be understood that while I have described the invention in connection with clutch pairs in which one member has side tooth surfaces that are longitudinally concave and the other member has side tooth surfaces that are longitudinally convex, both members may be made with longitudinally convex side tooth surfaces if quite restricted localization of tooth contact is desired.

Indeed, while a number of different embodiments of the invention have been described, it will be understood that the invention is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face clutch member having longitudinally curved teeth which are chamfered along their top edges, the chamfered portions of the teeth being longitudinally curved helicoidal surfaces.

2. A toothed face clutch member having longitudinally curved teeth which are chamfered along their top edges, the chamfered portions of the teeth being helicoidal surfaces of convex profile shape and of varying lead.

3. A pair of engaging toothed face clutch members, each of which has teeth that are chamfered along their top edges, the chamfered portions of the teeth of one member being surfaces of constant profile shape from one end to the other, and the chamfered portions of the teeth of the other member being helicoidal surfaces conjugate to the chamfered surfaces of the first member.

4. A pair of engaging toothed face clutch members, each of which has longitudinally curved teeth that are chamfered along their top edges, the chamfered portions of the teeth of one member being surfaces of revolution, and the chamfered portions of the teeth of the other member being helicoidal surfaces conjugate to the chamfered surfaces of the first member.

5. A pair of engaging toothed face clutch members, each of which has teeth that are chamfered along their top edges, the chamfered portions of the teeth of one member being surfaces of constant convex profile shape from one end to the other, and the chamfered portions of the teeth of the other member being also of convex profile shape, but being helicoidal surfaces conjugate to the chamfered surfaces of the first member.

6. A pair of engaging toothed face clutch members, each of which has longitudinally curved teeth chamfered along their top edges, the chamfered portions of the teeth of one member being helicoidal surfaces conjugate to the chamfered surfaces of the mating member.

7. A pair of engaging toothed face clutch members, each of which has longitudinally curved teeth which are chamfered along their top edges, the chamfered portions of the teeth of one member being surfaces of convex profile shape conjugate to the chamfered surfaces of the mate member.

8. A pair of engaging toothed face clutch members, each of which has longitudinally curved teeth that are chamfered along their top edges, the side surfaces and chamfered portions of the teeth of one of said members being coaxial surfaces of revolution, and the side surfaces of the teeth of the other member being also surfaces of revolution, but the chamfered portions of the teeth of the latter member being helicoidal surfaces conjugate to the chamfered surfaces of the first member.

9. A pair of engaging toothed face clutch members, each of which has longitudinally curved teeth that are chamfered along their top edges, opposite sides of spaced teeth of one member being longitudinally concave surfaces of revolution of straight profile shape, and opposite sides of spaced teeth of the other member being parts of a common longitudinally convex surface of revolution also of straight profile shape, the chamfered portions at opposite sides of spaced teeth of the first member being parts of a common surface of revolution of convex profile shape coaxial with the corresponding sides of said member, and the chamfered portions at opposite sides of spaced teeth of the other member being helicoidal surfaces of convex profile shape conjugate to the chamfered surfaces of the first member.

10. A pair of engaging toothed face clutch members, each of which has teeth which are chamfered along their top edges, the chamfered portions of the teeth of both members being of convex profile shape, and the chamfered portions of the teeth of one member being helicoidal surfaces of varying lead conjugate to the chamfered surfaces of the other member.

11. A pair of engaging toothed face clutch members, each of which has longitudinally curved teeth that are chamfered along their top edges, opposite sides of spaced teeth of both members being parts of common conical surfaces, the chamfered portions at opposite sides of spaced teeth of one member being parts of a common surface of revolution coaxial with the corresponding sides of said member, and the chamfered portions at opposite sides of spaced teeth of the other member being helicoidal surfaces conjugate to the chamfered surfaces of the first member.

12. A pair of engaging toothed face clutch members, each of which has longitudinally curved teeth that are chamfered along their top edges, opposite sides of spaced teeth of one member being longitudinally concave and parts of a common conical surface, and opposite sides of spaced teeth of the other member being longitudinally convex and parts of common conical surfaces, the chamfered portions at opposite sides of spaced teeth of the first member being parts of a common surface of revolution of convex profile shape coaxial with the corresponding sides of said first member, and the chamfered portions at opposite sides of spaced teeth of the other member being helicoidal surfaces of varying lead and convex profile shape conjugate to the chamfered surfaces of the first member, the bottoms of the tooth spaces of the first member lying in an external conical surface coaxial with the clutch, and the bottoms of the tooth spaces of the other member lying in an internal conical surface coaxial with the clutch.

13. A toothed face clutch member having longitudinally curved teeth which are chamfered along their top edges, the chamfered portions of the teeth being longitudinally curved helicoidal surfaces of varying lead whose inclination to the clutch axis increases from the inner to the outer ends of the teeth.

14. A toothed face clutch member having longitudinally curved teeth which are chamfered along their top edges, the chamfered portions of the teeth being of convex lengthwise and convex profile shapes and being helicoidal surfaces of varying lead whose inclination to the clutch axis increases from the inner to the outer ends of the teeth.

15. A pair of toothed face clutch members, each of which has longitudinally curved teeth and each of which has its teeth chamfered along their top edges, the chamfered portions at opposite sides of spaced teeth of one member of the pair being parts of common surfaces of revolution, and the chamfered portions of the teeth of the other member of the pair being longitudinally curved helicoidal surfaces of varying lead whose inclination to the clutch axis increases from the outer to the inner ends of the teeth.

ERNEST WILDHABER.